No. 785,442. PATENTED MAR. 21, 1905.
R. H. SIMONDS.
SPECTACLE FRAME.
APPLICATION FILED OCT. 22, 1904.

Witnesses
Roy D. Tolman.
Penelope Comberbach.

Inventor
Royal H. Simonds
By Rufus B. Fowler
Attorney

No. 785,442. Patented March 21, 1905.

UNITED STATES PATENT OFFICE.

ROYAL H. SIMONDS, OF SOUTHBRIDGE, MASSACHUSETTS, ASSIGNOR OF ONE-HALF TO LLEWELLYN J. SIMONDS, OF SOUTHBRIDGE, MASSACHUSETTS.

SPECTACLE-FRAME.

SPECIFICATION forming part of Letters Patent No. 785,442, dated March 21, 1905.

Application filed October 22, 1904. Serial No. 229,566.

*To all whom it may concern:*

Be it known that I, ROYAL H. SIMONDS, a citizen of the United States, residing at Southbridge, in the county of Worcester and Commonwealth of Massachusetts, have invented a new and useful Improvement in Spectacle-Frames, of which the following is a specification accompanied by drawings, forming a part of the same, in which—

Figure 1:
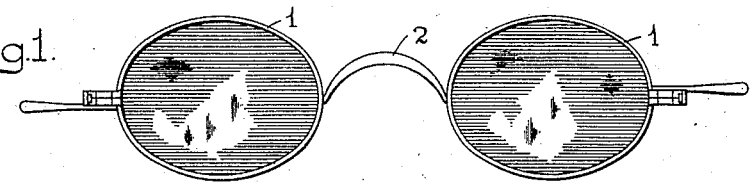
Figure 2:
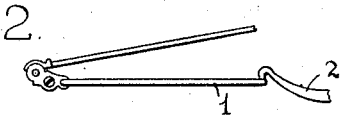
Figure 3:
Figure 4:
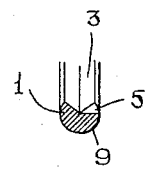
Figure 5:
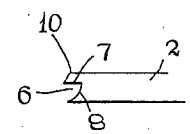
Figure 6:
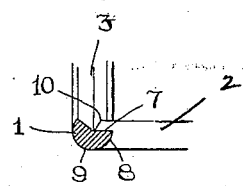
Figure 7:
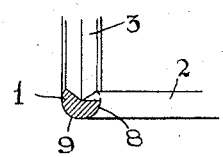
Figure 8:
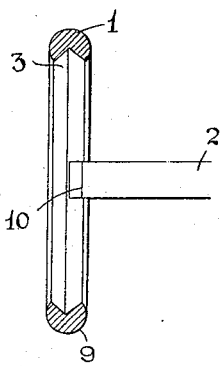
Figure 9:
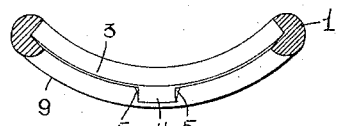

Figure 1 is a front view of a spectacle-frame embodying my invention. Fig. 2 is a top view of one eye-wire and a portion of the bridge. Fig. 3 is an end view of one eye-wire and a portion of the bridge. Fig. 4 is an enlarged sectional view of a portion of an eye-wire. Fig. 5 is an enlarged side view of that portion of the bridge which is attached to the eye-wire. Fig. 6 is an enlarged view of a section of the eye-wire and the bridge united. Fig. 7 is a similar view to Fig. 6 one step further advanced toward completion. Fig. 8 is an enlarged perspective view of the inside of an eye-wire, showing the bridge attached thereto; and Fig. 9 is an enlarged perspective view of a portion of the eye-wire before the bridge is attached.

Similar reference-figures refer to similar parts in the different views.

My invention relates to the method of attaching the bridge to the eye-wire or lens-inclosing portion of a spectacle-frame, which I accomplish in the following manner.

Referring to the accompanying drawings, 1 1 denote the eye-wires or lens-inclosing portions of a spectacle-frame, which are connected by the bridge 2. In the method at present in use the end of the bridge is swaged or hammered out to form an enlarged flange or shoulder, which is soldered upon the outside of the eye-wire.

As is well known, the inside of the eye-wire of a spectacle-frame is formed with a groove 3, into which the lens is fitted and which holds it in position. The first step in my invention is to make the notch 4, Fig. 9, by removing a portion of one side of the groove 3, leaving the side walls 5 5. This notch is made on the inside of the eye-wire and at the place where it is desired to attach the bridge. In the end of the bridge 2 I cut a notch 6, thereby making the bridge forked, as shown in Fig. 5. The bridge is then attached to the eye-wire, as shown in Fig. 6, the portion 7 of the notch 6 in the bridge resting upon the flat portion of the notch 4 in the eye-wire and the curved portion 8 of the notch 6 fitting the curved outside 9 of the eye-wire. The eye-wire 1 is therefore held on opposite sides between the portions 7 and 8 of the bridge, by which means the strength of the spectacle-frame is largely increased. After the bridge 2 is fastened to the eye-wire 1, as has been already described, the projecting corner 10 of the bridge is compressed by means of a die to the form shown in Fig. 7 to conform to the groove 3 in the eye-wire. The bridge may then be bent to the required shape, as is usual in the manufacture of spectacle-frames.

I obtain by my method an inclosing notch in the bridge which is attached to both the outer and inner sides of the eye-wire, the contact on one side being the flat surface with the flat surface of the notch 4, and the contact on the other side being the curved surface 8 with the outside of the eye-wire. An additional increase of strength is gained by the side walls 5 5 of the notch 4 in the eye-wire, which abut on the sides of the upper arm 7 of the bridge 2 and furnish an increased area of contact between the bridge and the eye-wire.

My method of providing sufficient area of contact between the bridge and the eye-wire by making the end of the bridge forked also obviates the necessity of hammering the end of the bridge into a curved flange, as practiced at present, which unavoidably weakens the bridge by disturbing the integrity of the metal in the flange.

What I claim as my invention, and desire to secure by Letters Patent, is—

1. As an article of manufacture, a spectacle-frame with the ends of the bridge having flat surfaces contacting with flat surfaces formed on the inside of the eye-wires and attached thereto.

2. As an article of manufacture, a spectacle-frame having a pair of grooved eye-wires provided with notches formed on the grooved side of said eye-wires, a bridge provided with ends adapted to enter said notches and contact with the bottom and side walls, with the ends of the bridge and eye-wires soldered together.

3. As an article of manufacture, a spectacle-frame having a pair of grooved eye-wires provided with notches formed on the grooved side of said eye-wires, a bridge having its ends forked with one of the forks entering the notch in the eye-wire and the other fork of the bridge contacting with the outer side of the eye-wire, with the ends of the bridge and the eye-wires soldered together.

4. As an article of manufacture, a spectacle-frame consisting of a pair of grooved eye-wires provided with notches on their grooved sides to receive the end of a bridge, and a bridge having its ends shaped to fit said notches and inserted therein and soldered to the eye-wires.

5. In a spectacle-frame, the combination of an eye-wire having its inner side grooved to receive the lens, a notch on the grooved side of the eye-wire forming a flat surface on the bottom of the notch for the end of the bridge, and a bridge having its end provided with a flat surface to contact with the bottom of said notch.

6. In a spectacle-frame, the combination of an eye-wire having its inner side grooved to receive a lens, a notch on the inner side of the eye-wire and on one side of the groove, a bridge having its end inserted in said notch and soldered to the eye-wire, with its end swaged to restore the continuity of the groove.

Dated this 19th day of October, 1904.

ROYAL H. SIMONDS.

Witnesses:
PENELOPE COMBERBACH,
RUFUS B. FOWLER.